Aug. 23, 1938.    G. R. McKAY    2,127,781
GLASS ETCHING
Filed March 12, 1936

Inventor
George R. McKay
By Richard L. Underwood
Attorney

Patented Aug. 23, 1938

2,127,781

UNITED STATES PATENT OFFICE 2,127,781

GLASS ETCHING

George R. McKay, Garden City, N. Y., assignor to McKay Company, New York, N. Y., a partnership Application March 12, 1936, Serial No. 68,527

4 Claims. (Cl. 41—42)

This invention relates to the etching of glass and has particular reference to etching a portion of a glass surface for decorative purposes, or to make signs, etc., as distinguished from that type of glass etching wherein the entire glass surface is etched.

An object of the invention is to facilitate the ease and rapidity with which glass surfaces may be so etched and to reduce to as great an extent as possible the need for extreme care and delicacy in carrying out the operation. Those inexperienced in this art are thereby enabled to easily produce such etched designs as they may desire from time to time without the need of expert assistance.

A further object of the invention is to produce, primarily for decorative effects or signs as above stated, a very sharply defined design upon a glass surface of any contour. It is well known that ammonium bifluoride constitutes the only satisfactory base for all so-called safe glass etching solutions. In the past it has been customary to apply etching compounds, sometimes in the form of a paste utilizing this substance as a base, in various ways which have proved unsatisfactory from the standpoint of clean-cut and sharply defined designs, as well as from the standpoint of the complexity of the operation and the necessary time consumed.

One manner of applying the etching compound consists in depositing such compound in the form desired for the resulting etch upon a transfer sheet, subsequently applying the transfer sheet to the glass to transfer the compound from the transfer sheet to the glass, removing the transfer sheet in some manner so that the contour of the desired etch is mutilated as little as possible, and subsequently processing the glass to produce the etch. Obviously such procedure involves considerable risk of producing a design of irregular contour failing to conform precisely with the desired contour and lacking in a clear definition which is highly desirable. In such procedure the transfer sheet must be first coated with a so-called "acid resist" so that the etching compound will not injure or destroy the said transfer sheet.

Furthermore, it is old to deposit an etching compound, preferably in the form of paste, by brushing the same over a glass surface or, if the entire glass surface is to be etched. dipping the glass into such a compound. Obviously depositing an etching compound directly to the surface of the glass by means of brushing the same thereon substantially precludes the possibility of producing a series of uniform etchings, which are as a rule highly desirable, if not essential. In the brush procedure as outlined the resulting etch depends entirely on the individual artistry of the operator.

My improved process may be regarded as a screening operation and in some ways is not unlike the procedure used in the application of color to metal or other surfaces. In carrying out this process I apply an etching compound to the glass surface to be etched through the interstices of a pervious screen which is coated on one side with a suitable "acid resist" which delineates the individual design to be etched. I have found that for this screening operation a fabric mesh screen, preferably a fine mesh silk screen, is eminently suitable.

For purposes of illustration I have disclosed one method by which my improved process may be carried out and for that reason reference is now made to the drawing, wherein.

The mesh screen is indicated by the numeral 10. This screen is coated in any suitable way with any one of various satisfactory acid resists, which may be composed of varnish, asphaltum, wax, paraffin, or suitable mixtures thereof. These will produce a protective coating operable to prevent penetration of the etching compound. Such a coating is indicated at 12 and any desired design 14 imparted to the coating layer leaves portions of the screen 10 exposed, thereby forming a stencil.

Figure 1:
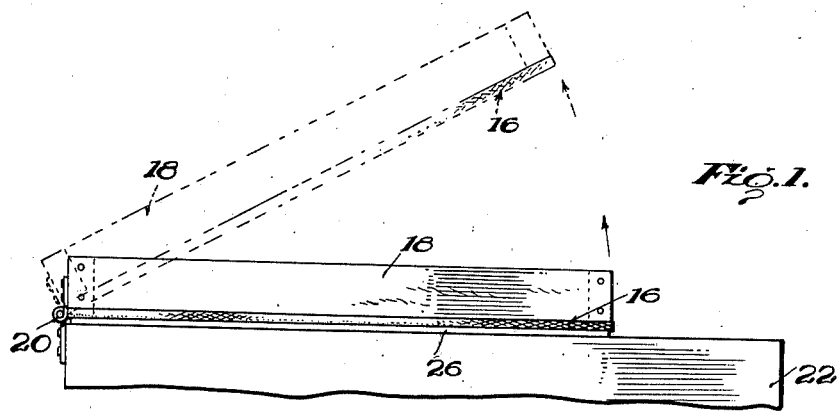
Figure 1 is an elevation of a suitable apparatus for carrying out the screening operation.
Figure 2:
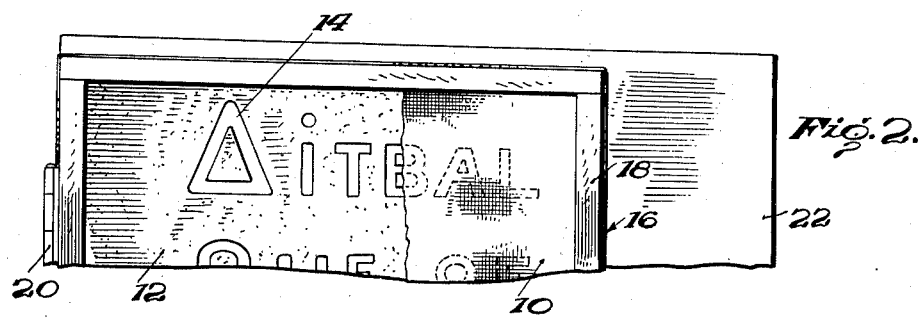
Figure 2 is a top plan view, showing one layer of the composite screen broken away.
Figure 3:
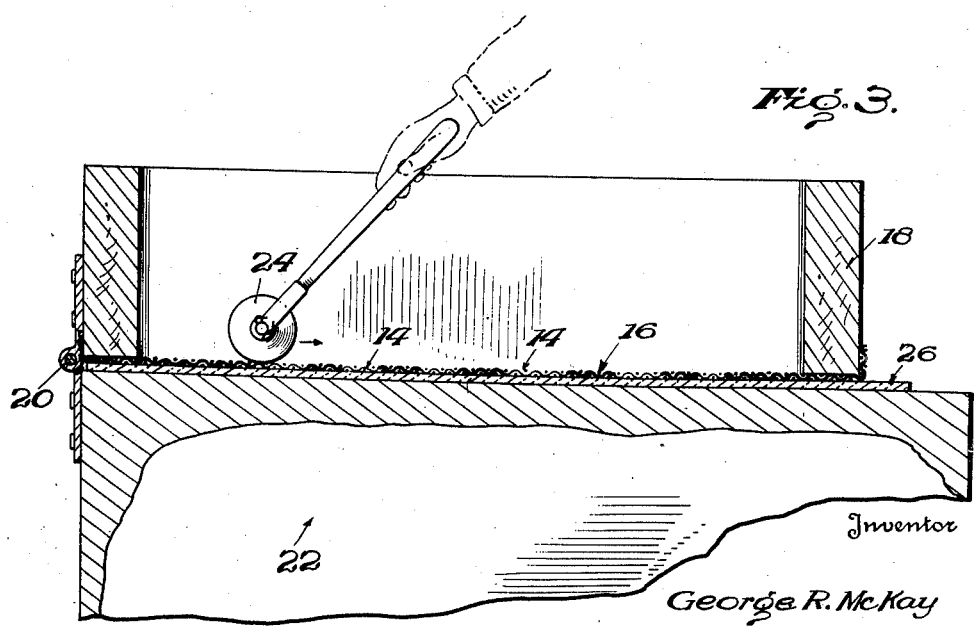
Figure 3 is a sectional side elevation illustrating one manner in which the etching compound may be screened.

This composite screen, indicated in Figure 3 broadly by the numeral 16, may be stretched across the bottom of an open rectangular frame 18. The lighter portions of the composite screen 16, as shown in Figure 3, indicate the deleted portions of the acid resist coating 12 which form the design 14.

The rectangular frame may be hinged as indicated at 20 to a support 22 so that the said frame may be raised and lowered as consecutive pieces of glass are positioned under the screen for the application of the etching compound.

An important feature of this improved etching process resides in the use of an etching compound which is of a pasty but not a tacky consistency. A pasty compound of such consistency may be easily screened by means of a squeegee or roller 24 of some sort, as indicated in Figure 3, but any tackiness in the consistency of such paste tends to close the interstices formed by the mesh, thereby precluding the passage of the etching agent contained in the compound through the said interstices for deposit on the glass. It has been found that the use of tragacanth in suitable proportion to the other constituents of the etching compound results in a pasty mass which is substantially free from the undesirable tacky characteristics inherent in most gummy substances.

A further important feature resides in the use of a compound having a maximum concentration of etching agent, using the customary ammonium bifluoride as the base, but which is substantially devoid of crystalline structure. By rendering the etching compound substantially devoid of crystals, it is possible to force the said compound through the interstices of the screen by the use of moderate pressure. At the same time destruction of the screen is avoided by substantial elimination of bifluoride crystals from the paste, and there is no danger of clogging the interstices of the screen by such undissolved crystals. Such a paste can be forced evenly through the screen so that it results in a perfect etch and is at the same time not injurious to the hands or clothing of the operator and will not injure the screen.

A paste such as that hitherto described may be made in the following manner: First, the base for the etching agent, ammonium bifluoride in the form of crystals, is dissolved in water and cryolite is added to the batch. A suitable batch comprises 9 lbs. water, 7 lbs. ammonium bifluoride, and 5 lbs. cryolite. The cryolite simply functions as a bleacher or whitener to produce a light colored liquid. This batch is boiled and thereafter permitted to cool. During the cooling operation it is constantly stirred or agitated in some way to prevent crystallization of the ammonium bifluoride. Surplus ammonium bifluoride crystals are allowed to settle out at the bottom of the supersaturated solution and, after the batch has stood for a period sufficient to permit cooling to approximately room temperature, as much of the upper liquid is decanted as is possible withou including any of the surplus crystals.

Into this clear fluid is placed 1 lb. of tragacanth which, as hitherto stated, is a gummy substance which has been found suitable to produce a pasty consistency in the compound without resulting in such tackiness as would close the interstices of the screen when the compound is applied thereto. This mixture is agitated or whipped until a homogeneous pasty mass results, which mass is substantially devoid of crystalline structure. By substantially eliminating crystalline structure from the homogeneous pasty mass, clogging of the screen interstices by such crystals is eliminated and the full strength of the etching agent may contact the glass to produce the best etch.

In carrying out the screening operation a glass surface 26 is positioned under the composite screen 16, the acid resist coating 12 of the screen preferably being adjacent the surface to be etched and adapted to contact the same. While it might be possible to place the surface to be etched adjacent and in contact with the mesh screen itself, a much more clearly delineated design is obtained by the reverse position. A pasty etching compound such as has hitherto been described is then applied to the composite screen, preferably to the mesh screen itself, as hitherto specified. It is forced through the interstices of the mesh screen along the stenciled portions 14 of the acid resist, and thus deposited in a sharply defined configuration upon the surface of the glass. It has been found that the best temperature at which to work the compound is between 68° and 80° F., although such range does not constitute any real limitation of the improved process described herein. After the compound has thus been applied to the glass, the latter is removed and washed with water after two or three minutes' exposure, during which time the design is etched.

It is obvious that the process herein described is extremely simple and that the same screen may be used for one glass surface after another with extreme rapidity. The mere fact that I have disclosed simplified mechanism for etching a plane glass surface is in no wise deemed a limitation on this invention. Obviously such a screen may be in the form of a roll, or otherwise, and the etching compound applied to glass surfaces of varying contours.

Having described the important features of the invention, various modifications of the details herein set forth for purposes of illustration may become apparent and for that reason I wish to limit myself only within the scope of the appended claims.

What I claim is:

1. A process of etching glass which includes the steps of coating that portion of a pervious screen surrounding the design to be etched with a suitable acid resist, positioning the coated side of the screen against the glass, and applying to the uncoated side of the screen an etching compound of such consistency that the interstices of the screen will not become clogged and a maximum concentration of etching agent is deposited on the glass.

2. A process of etching glass which includes the steps of coating that portion of a pervious screen surrounding the design to be etched with a suitable acid resist, positioning the coated side of the screen against the glass, and applying to the uncoated side of the screen an etching compound of such consistency that the interstices of the screen will not became clogged and a maximum concentration of etching agent is deposited on the glass, permitting the compound so deposited to remain for a limited period, and washing the glass.

3. A process of etching glass which includes the steps of coating that portion of a previous screen surrounding the design to be etched with a suitable acid resist, positioning one side of the screen against the glass, and pressure applying to the other side of the screen and through the interstices thereof an etching paste of such consistency that the interstices of the screen will not become clogged and a maximum concentration of etching agent is deposited on the glass.

4. A process of etching glass which includes the steps of coating that portion of a pervious screen surrounding the design to be etched with a suitable acid resist, positioning the coated side of the screen against the glass, and pressure applying to the uncoated side of the screen and through the interstices thereof an etching paste of such consistency that the interstices of the screen will not become clogged and a maximum concentration of etching agent is deposited on the glass.

GEORGE R. McKAY.

CERTIFICATE OF CORRECTION.

Patent No. 2,127,781. August 23, 1938.

GEORGE R. McKAY.

It is hereby certified that error appears in the printed specification of the above numbered patent requiring correction as follows: Page 2, first column, line 49, for "withou" read without; and second column, line 46, claim 2, for "on" read an; line 54, claim 3, for "previous" read pervious; and that the said Letters Patent should be read with this correction therein that the same may conform to the record of the case in the Patent Office.

Signed and sealed this 15th day of November, A. D. 1938.

Henry Van Arsdale (Seal) Acting Commissioner of Patents.